Figure 1:
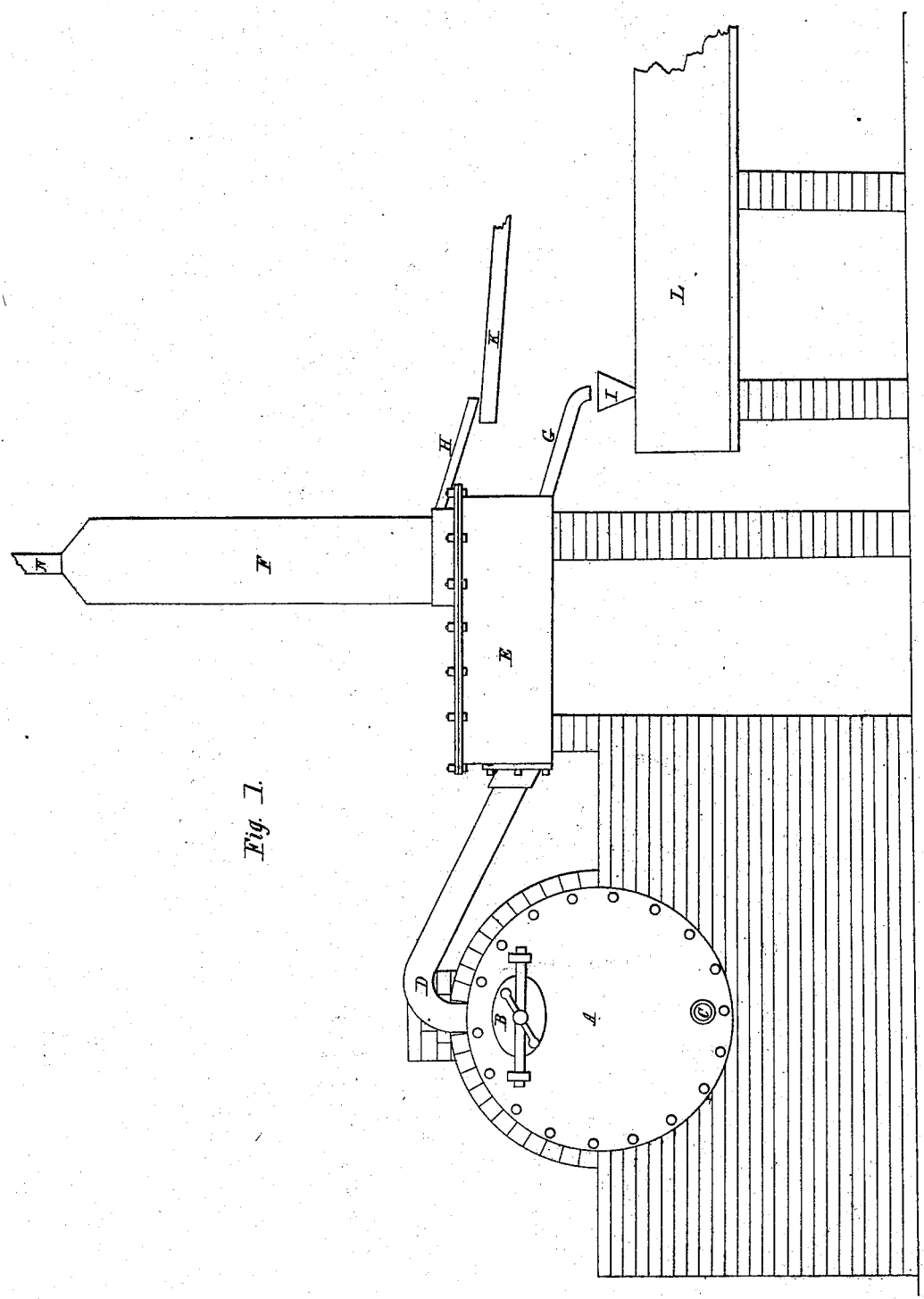
Figure 2:
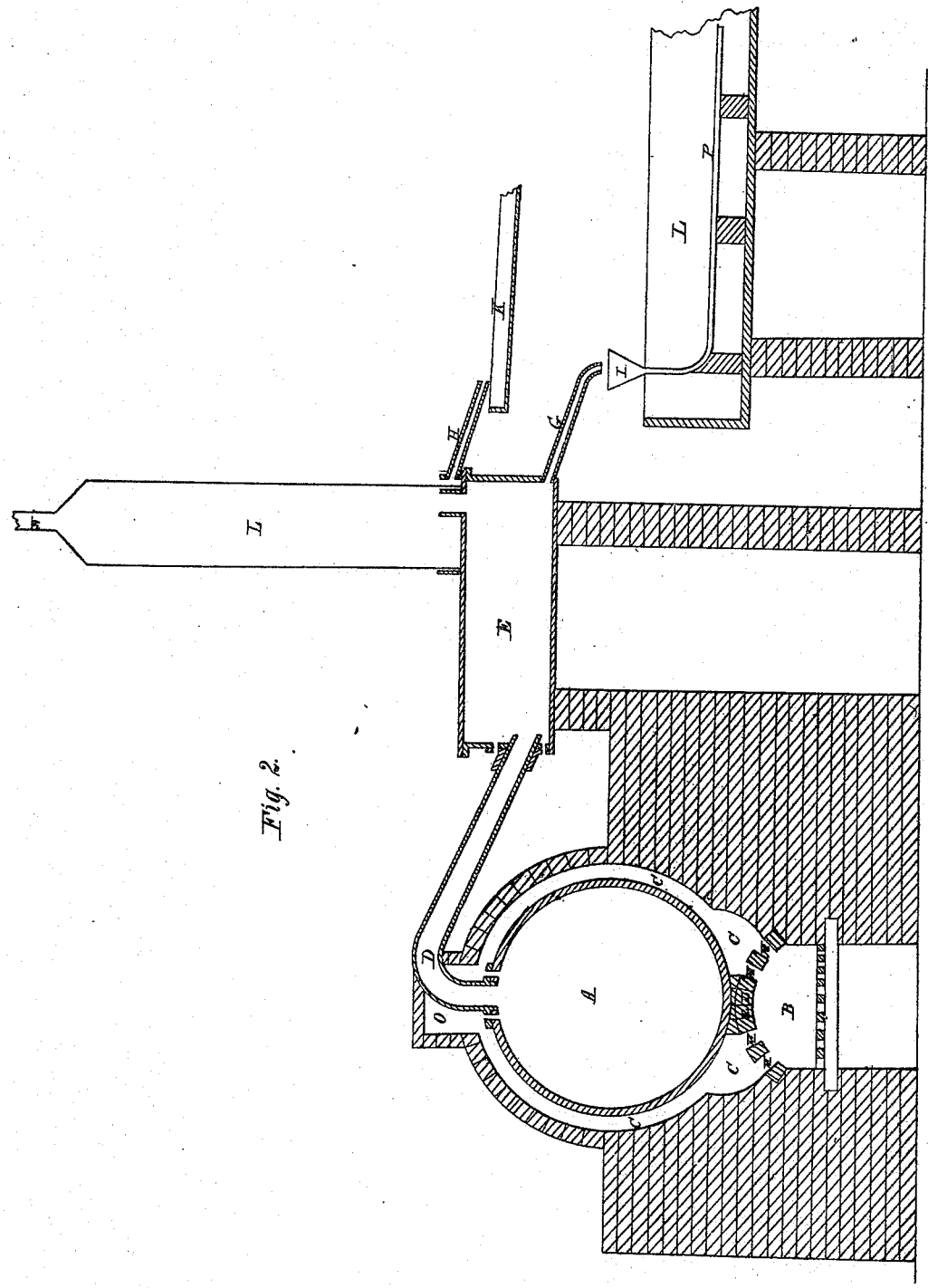

2 Sheets—Sheet 1.

W. T. CLOUGH.
MAKING OIL.

No. 4,008. Patented Apr. 22, 1845.

2 Sheets—Sheet 2.

W. T. CLOUGH.
MAKING OIL.

No. 4,008. Patented Apr. 22, 1845.

UNITED STATES PATENT OFFICE.

WILLIAM T. CLOUGH, OF JERSEY CITY, NEW JERSEY.

IMPROVEMENT IN THE MANUFACTURE OF OIL FROM RESIN.

Specification forming part of Letters Patent No. 4,008, dated April 22, 1845.

*To all whom it may concern:*

Be it known that I, WILLIAM T. CLOUGH, of Jersey City, in the State of New Jersey, have discovered a process not hitherto known for manufacturing a useful oil, as herein described.

The oil is a compound of carbon and hydrogen, which I procure by the dry distillation of rosin, or from the residual tarry liquids of the "rosin gas-works." I place twelve barrels of rosin, or an equal bulk of the tar from the rosin gas-works, in the still A, No. 1, through the charging-door B, (the still with its condensers may be made of cast or wrought iron, or any other suitable material,) the cover for which is then screwed firmly into its place, the outer side of which has been previously smeared with loam or clay or any other suitable material, to prevent the escape of oil-vapor during the distillation. Fire is then placed in the furnace B, No. 2, the flame and heat from which rise, through the openings M in the fire-arch L, into the flues C, circulating round each half of the still A, and terminating in the flue O, communicating with the chimney of the works. In the flue O there must be a damper near the chimney, or in any convenient place, to regulate the heat during the process of distillation. During the early part of the distillation a quantity of acid mixed with a dark-colored oil is discharged from the pipe G into the funnel I, attached to the pipe P, contained in the cooling-trough L, which I keep filled with cold water, and thence into a receiver placed at the extremity of P, and at the same time acid and a small portion of oil are discharged by the pipe H from the post-condenser F into the spout K, and thence into a receiver. The pipe N on the top of the condenser F allows the uncondensable gases to escape during the process. When about fifty gallons in all of this mixture of oil and acid have been obtained from the pipes H and G, oil of a brownish-red color, but nearly free from acid, is discharged by the pipe G, and a very small portion of acid at H.

Particular attention must now be paid to the fire in B, in order that the stream of oil which flows from G may be continued as regular as possible—say to the extent of twenty-five gallons per hour. If the fire is urged too strong, rosin in an undecomposed state will be distilled over along with the oil, which considerably injures the subsequent operations. The period for suspending the distillation may be known by the oil assuming a light greenish tint. The fire must then be withdrawn from B, and the still allowed to cool for four hours. The plug is then withdrawn from the short pipe C, No. 1, and the pitchy residuum will flow into any convenient vessel placed to receive it. The mixture of oil and acid produced at the commencement of the operation is allowed to separate in the vessels in which it has been received, and the oil rising to the surface of the acid is decanted and mixed with the oil obtained during the remainder of the distillation, to be again introduced into the still for a second operation, in the early stage of which a portion of oil will distill over mixed with acid, which must be allowed to subside as before. When the oil is free from acid, (which may be ascertained by its having lost the peculiar sour smell resulting from its admixture with that organic compound,) it may be run into any convenient receiver placed at the extremity of the pipe P. The process, as in the first case, must be discontinued when the green color makes its appearance in the oil, time being allowed for cooling the apparatus as before. The pitchy residuum is to be discharged at C, the redistillation to be continued until the oil is of the desired purity.

I do not claim the particular form or description of apparatus, still, or retorts as set forth in the drawings Nos. 1 and 2 herewith.

What I claim is—

1. The process or mode of producing the American oil, as set forth in the above specification and drawings. Such apparatus may be modified or varied, as circumstances may require, from time to time, when deemed expedient.

2. The process, as hereinabove set forth, of producing the substance which I denominate the "American oil," such process being conducted substantially in the manner described.

W. T. CLOUGH.

Witnesses:
HENRY HAWLEY,
JAMES C. BELL.